United States Patent [19]

Suzuki et al.

[11] Patent Number: 5,479,303
[45] Date of Patent: Dec. 26, 1995

[54] METHOD AND APPARATUS FOR VISUAL SEARCH CONTROL OF DIGITAL VIDEO FILES

[75] Inventors: Hideharu Suzuki, Tokyo; Yutaka Ishibashi, Aichi; Kazutoshi Nishimura, Tokyo, all of Japan

[73] Assignee: Nippon Telegraph and Telephone Corporation, Tokyo, Japan

[21] Appl. No.: 139,429

[22] Filed: Oct. 20, 1993

[30] Foreign Application Priority Data

Oct. 21, 1992 [JP] Japan ................................. 4-282572

[51] Int. Cl.⁶ ........................................... H04N 5/915
[52] U.S. Cl. ..................... 360/72.2; 360/10.1; 360/27; 360/33.1; 360/48; 358/342
[58] Field of Search ................... 360/72.2, 72.3, 360/70, 73.05, 73.06, 73.07, 73.08, 27, 74.01, 10.1, 61, 72.1, 33.1, 48, 49; 358/342

[56] References Cited

U.S. PATENT DOCUMENTS 5,233,485  8/1993  Yang ........................ 360/72.1
5,371,602 12/1994  Tsuboi et al. ............. 360/33.1 X

FOREIGN PATENT DOCUMENTS 60-57560  4/1985  Japan .
62-181    1/1987  Japan .
2193476   7/1990  Japan .
2294984  12/1990  Japan .
4111076   4/1992  Japan .

*Primary Examiner*—Aristotelis Psitos
*Assistant Examiner*—James L. Habermehl
*Attorney, Agent, or Firm*—Banner & Allegretti, Ltd.

[57] ABSTRACT

A visual search control of digital video files capable of realizing a high quality image even in the fast forward and fast reverse modes, while facilitating a quick mode switching among the normal playback mode and the fast forward and fast reverse modes. Each digital video file contains: normal playback data for a normal playback mode; fast forward and fast reverse data for fast forward and fast reverse modes; and a frame management information containing an entry for each frame in the normal playback data and the fast forward and fast reverse data, where each entry registers a frame number of each frame, and a switching target frame number indicating a frame number of a next frame to be read out next when a mode switching occurs; such that when a mode switching request is received along with a currently displayed frame number from a user terminal, an entry in the frame management information which registers the frame number identical to the received currently displayed frame number is looked up to obtain the switching target frame number registered therein and the requested mode switching is made by making an access to the next frame indicated by the obtained switching target frame number, reading out digital video data starting from the next frame, and transferring the read out digital video data to the user terminal.

10 Claims, 6 Drawing Sheets

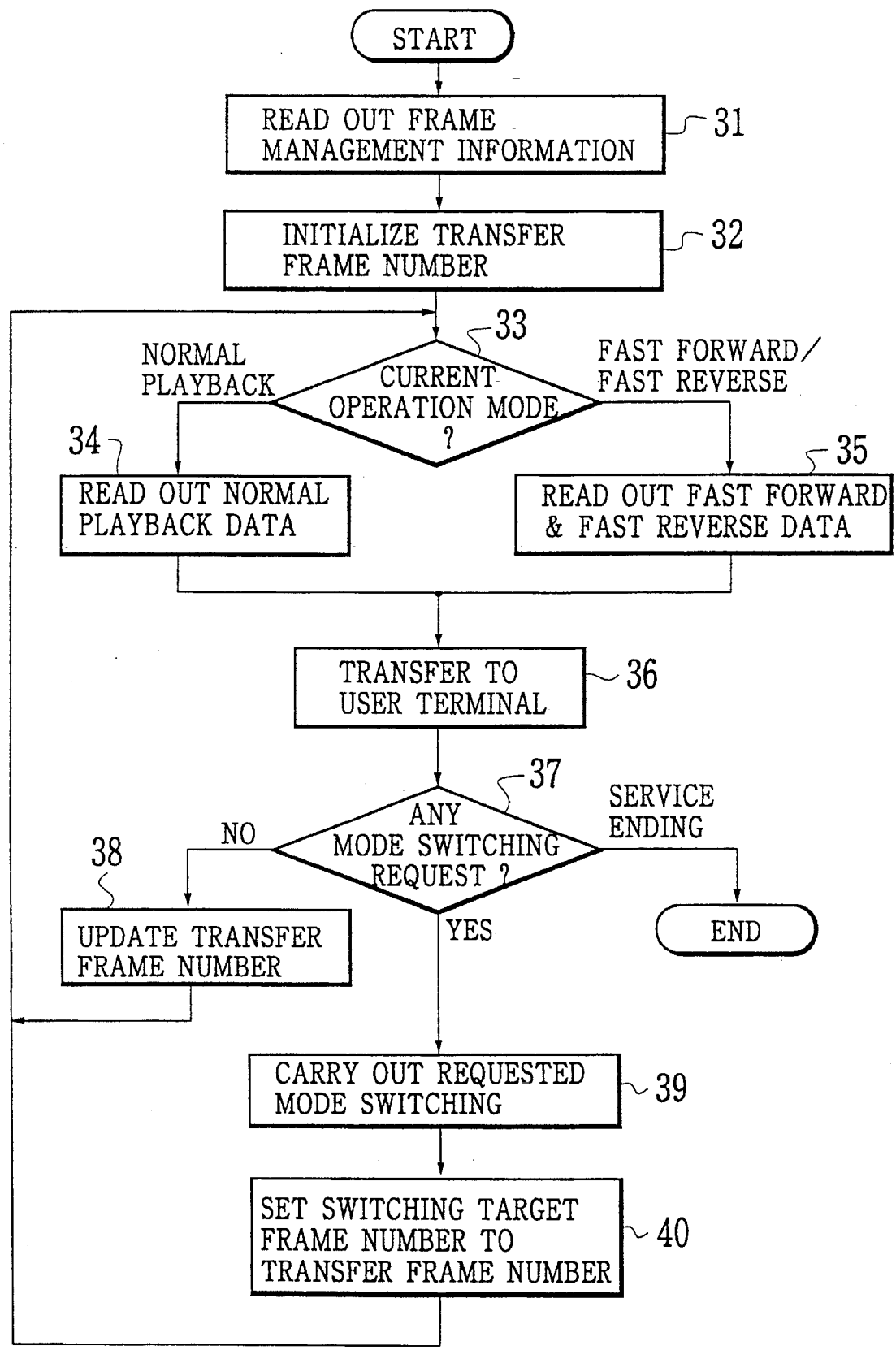

METHOD AND APPARATUS FOR VISUAL SEARCH CONTROL OF DIGITAL VIDEO FILES

BACKGROUND OF THE INVENTION

1. Field of the Invention

The present invention relates to a visual search control of digital video files used in a video-on-demand system in which a desired one of the digital video files stored in a storage unit at a center is read out and transferred to a user terminal for the display in response to the user's request, which facilitates fast forward and fast reverse modes in addition to a normal playback mode and a switching of these operation modes in accordance with the user's request.

2. Description of the Background Art

Conventionally, the extended data such as the digital video data are managed in forms of sequential files on magnetic recording tapes operated by the VTR (Video Tape Recorder). In such a conventional digital video filing system using magnetic recording tapes, the fast forward and fast reverse modes have been realized by increasing the feeding speed of the tape from that of the normal playback mode while skipping as many frames as necessary.

In a case the digital video files are stored in a randomly accessible storage unit such as a magnetic disk, a read head is moved appropriately to skip as many frames as necessary.

An exemplary configuration of a conventional video-on-demand system using such digital video files is shown in FIG. 1, in which a plurality of user terminals 51 are connected to a center 53 through a network 52, where the center 53 comprises a storage unit 54 such as a magnetic disk for storing the digital video files, a storage unit interface 55 for controlling accesses to the storage unit 54, and a network Interface 56 for controlling connections of the center 53 with the network 52.

In this video-on-demand system of FIG. 1, the request 57 from each user terminal 51 is transferred to the network interface 56 of the center 53 through the network 52. In response to the received request, the storage unit interface 55 reads out the appropriate digital video data 58 from the storage unit 54 and transfer the read out digital video data 58 to the user terminal 51 which issued the request through the network 52 such that the desired digital video data 58 can be displayed on the user terminal 51. It is also possible for some user terminals 51 to be directly connected with the center 53, without using the network 52, if desired.

In this video-on-demand system of FIG. 1, the visual search control between the normal playback mode and the fast forward mode, for example, is carried out according to the timing chart of FIG. 2 as follows.

Namely, the normal playback mode is carried out by reading the video files in units of groups, one group per each cycle, where each group contains a predetermined number of frames to be read out together in one cycle. On the other hand, the fast forward and fast reverse modes are carried out by reading in units of frames, with a prescribed number of frames skipped between successive readings of the frames, in each cycle.

Thus, in an exemplary case depicted in FIG. 2, after the data transfer at the cycle-1, the normal playback mode is continued up to a middle of the cycle-2 at which a mode switching request 41 to switch from the normal playback mode to the fast forward mode is received from the user terminal. When this mode switching request 41 is received, it is necessary to skip to a first frame to be read out in the fast forward mode, so that there is a mode switching period of 0.06 sec. as explained below, between the receiving of the mode switching request 41 and the actual mode switching from the normal playback mode to the fast forward mode. During this mode switching period, the preceding mode of the normal playback mode is continued on the user terminal.

Then, the next mode switching request 42 to switch from the fast forward mode to the normal playback mode is received during the cycle-2. When this mode switching request 42 is received, it is necessary to read out one group of video files to be read out in the normal playback mode before the actual mode switching, so that there is a mode switching period of 0.2 sec. as explained below, between the receiving of the mode switching request 42 and the actual mode switching from the fast forward mode to the normal playback mode. During this mode switching period, the display on the user terminal is paused.

In this example, each video file containing video data as well as audio data is provided in a form of a bit sequence encoded at the bit rate of 6 Mbps. Thus, in a case of realizing 30 frames/sec. of the reading rate, each frame has 0.2 Mbits. For the sake of simplicity, it is assumed that one group is formed by 18 frames, so that each group has 3.6 Mbits. Now, when the access time of the storage unit 54 is 50 msec., and the transfer rate of the storage unit 54 is 24 Mbps, a time required for reading one group is given by:

$$50 \text{ msec.} + 3.6 \text{ Mbits}/24 \text{ Mbps} = 0.2 \text{ sec.}$$

while a time required for reading one frame is given by:

$$50 \text{ msec.} + 0.2 \text{ Mbits}/24 \text{ Mbps} = 0.06 \text{ sec.}$$

which are the mode switching periods used above.

In a case of the normal playback mode, it is only necessary to read one group per each cycle of 0.6 sec., whereas in a case of the fast forward and fast reverse modes, as many frames as necessary are skipped according to the desired searching rate. Here, however, since the reading of one frame requires 0.06 sec., a maximum number of frames that can be read out within one cycle is limited to 10.

Now, in this conventional visual search control, because the skipping of the frames is required in the fast forward and fast reverse modes, the overhead of the disk access such as the seek time and the latency time of a disk drive arises every time one frame is read out. Thus, when one frame in each two successive frames is skipped, it is only possible to read out 16 frames per sec., (1 sec./0.06 sec. 16.7 frames), which is much smaller than the reading rate of 30 frames per sec. realized in the normal playback mode. Consequently, the a number of frames that can be read out and displayed in the fast forward and fast reverse modes per unit time is decreased from that for the normal playback mode, such that the displayed video image in the fast forward and fast reverse mode is going to be an awkward and discontinuous poor quality image.

SUMMARY OF THE INVENTION

It is therefore an object of the present invention to provide a method and an apparatus for visual search control of digital video files, capable of realizing a high quality image even in the fast forward and fast reverse modes, while facilitating a quick mode switching among the normal playback mode and the fast forward and fast reverse modes.

According to one aspect of the present invention there is provided a method of visual search control of digital video files, comprising the steps of: (a) storing digital video files in storage means in a data format in which each digital video file contains: normal playback data to be read out in a normal playback mode; fast forward and fast reverse data to be read out in fast forward and fast reverse modes; and a frame management information containing an entry for each frame in the normal playback data and the fast forward and fast reverse data, where each entry registers a frame number of said each frame, and a switching target frame number indicating the frame number of a next frame to be read out next when a mode switching occurs; (b) receiving a mode switching request along with a currently displayed frame number from a user terminal; (c) looking up an entry in the frame management information of an appropriate one of the digital video files which registers the frame number identical to the currently displayed frame number received along the mode switching request at the step (b), to obtain the switching target frame number registered therein; and (d) carrying out the mode switching requested by the mode switching request received at the step (b) by making an access to the next frame indicated by the switching target frame number obtained from the entry looked up at the step (c), reading out digital video data starting from the next frame from an appropriate one of the normal playback data and the fast forward and fast reverse data stored in the storage means, and transferring the read out digital video data to the user terminal.

According to another aspect of the present invention there is provided an apparatus for visual search control of digital video files, comprising: storage means for storing digital video files in a data format in which each digital video file contains: normal playback data to be read out in a normal playback mode; fast forward and fast reverse data to be read out in fast forward and fast reverse modes; and a frame management information containing an entry for each frame in the normal playback data and the fast forward and fast reverse data, where each entry registers a frame number of said each frame, and a switching target frame number indicating the frame number of a next frame to be read out next when a mode switching occurs; and data management means for receiving a mode switching request along with a currently displayed frame number from a user terminal, looking up an entry in the frame management information of an appropriate one of the digital video files which registers the frame number identical to the currently displayed frame number received along the mode switching request to obtain the switching target frame number registered therein, and carrying out the mode switching requested by the mode switching request by making an access to the next frame indicated by the switching target frame number obtained from the entry looked up, reading out digital video data starting from the next frame from an appropriate one of the normal playback data and the fast forward and fast reverse data stored in the storage means, and transferring the read out digital video data to the user terminal.

Other features and advantages of the present invention will become apparent from the following description taken in conjunction with the accompanying drawings.

BRIEF DESCRIPTION OF THE DRAWINGS

FIG. 6 is a flow chart for the visual search control operation in the video-on-demand system of FIG. 3.

DETAILED DESCRIPTION OF THE PREFERRED EMBODIMENTS

Figure 1:
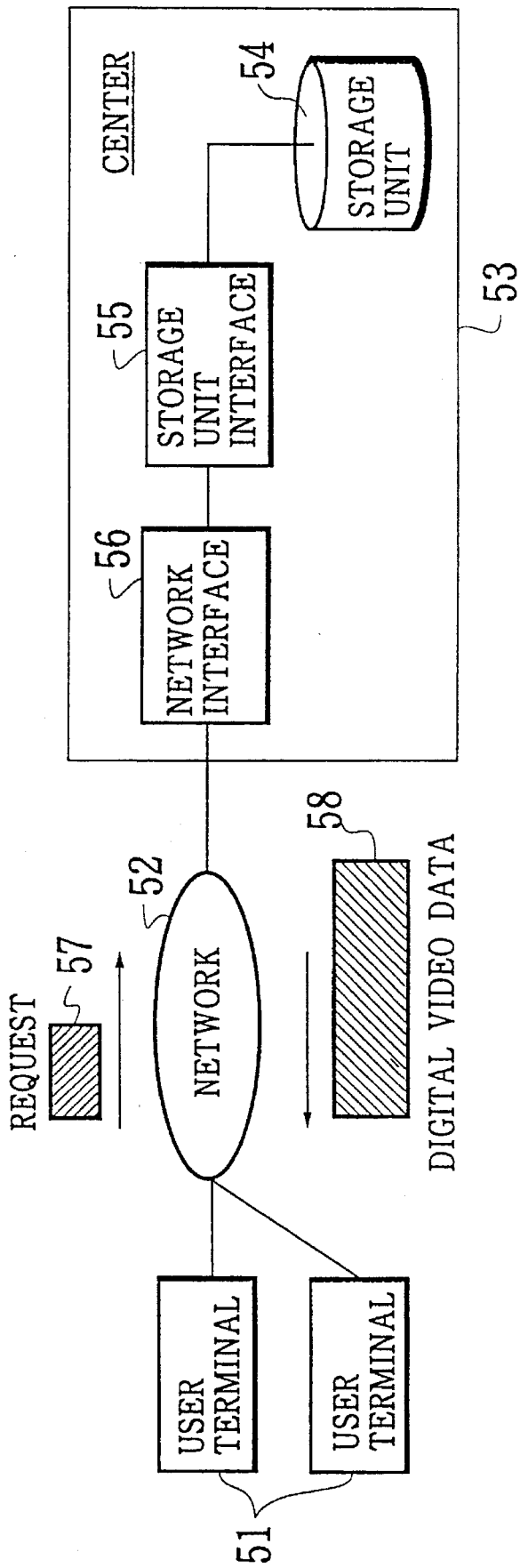
FIG. 1 is a schematic block diagram of a conventional video-on-demand system incorporating visual search control of digital video files.
Figure 2:
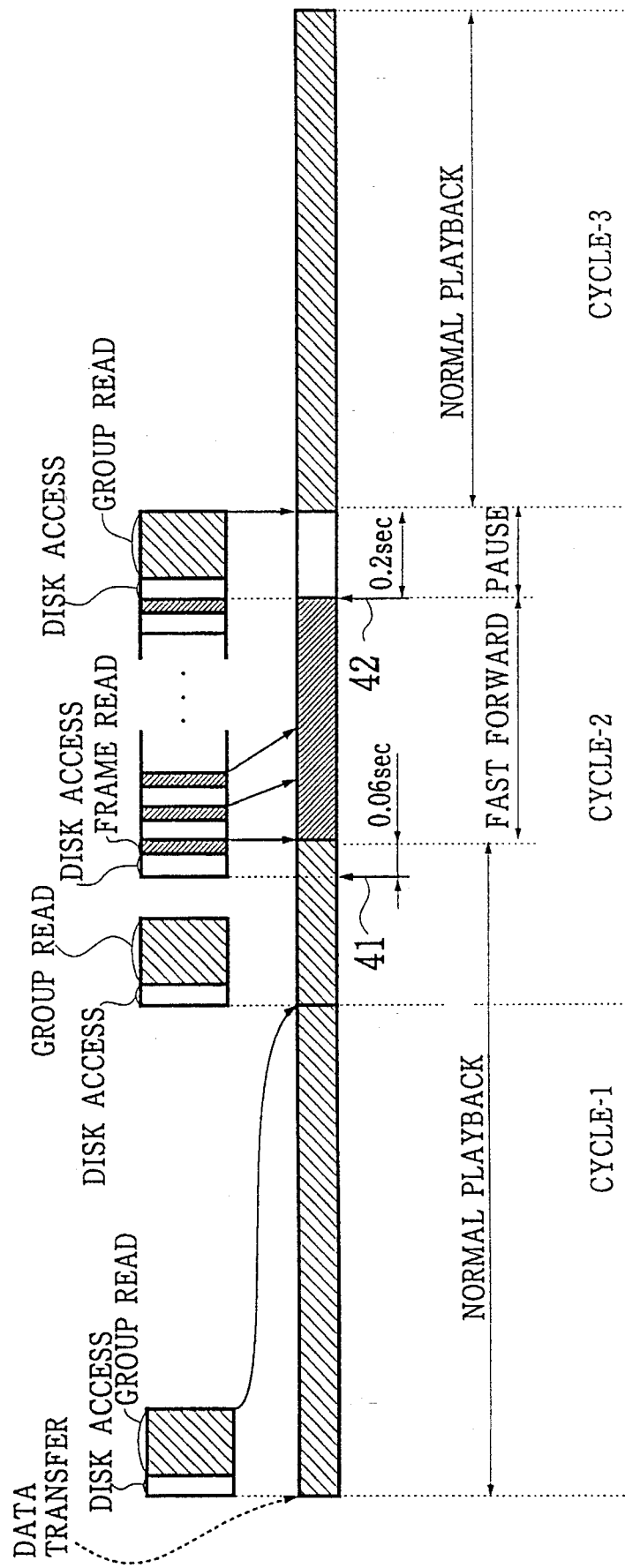
FIG. 2 is a timing chart for the visual search control operation in the video-on-demand system of FIG. 1.
Figure 3:
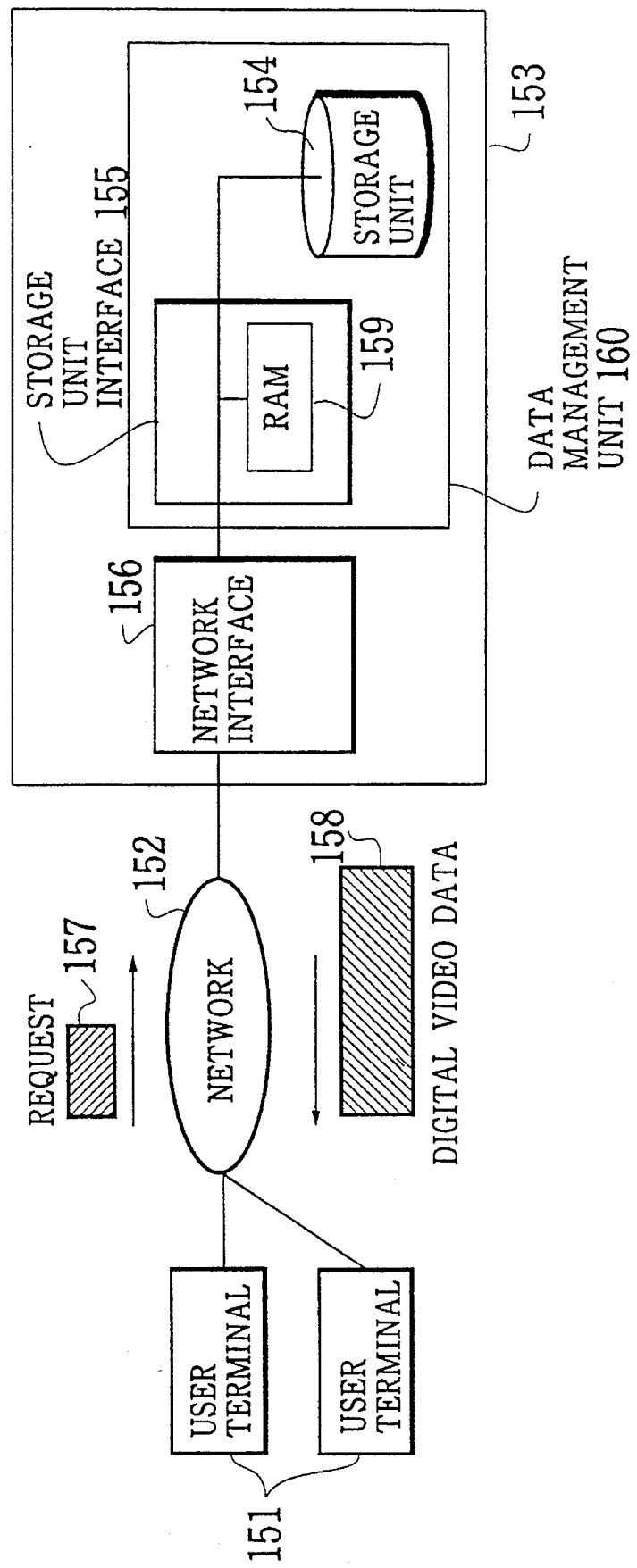
FIG. 3 is a schematic block diagram of one embodiment of a video-on-demand system incorporating visual search control of digital video files according to the present invention.

Referring now to FIG. 3, one embodiment of a video-on-demand system incorporating visual search control of digital video files according to the present invention will be described in detail.

In this embodiment, the video-on-demand system has a configuration shown in FIG. 3 which generally comprises a plurality of user terminals 151 connected to a center 53 through a network 152.

The center 153 comprises: a network interface 156 for controlling connections of the center 153 with the network 152; and a data management unit 160 including a storage unit 154 such as a magnetic disk for storing the digital video files in a data format to be described in detail below, and a storage unit interface 155 for controlling accesses to the storage unit 154 containing a RAM (Random Access Memory) 159.

Figure 4:
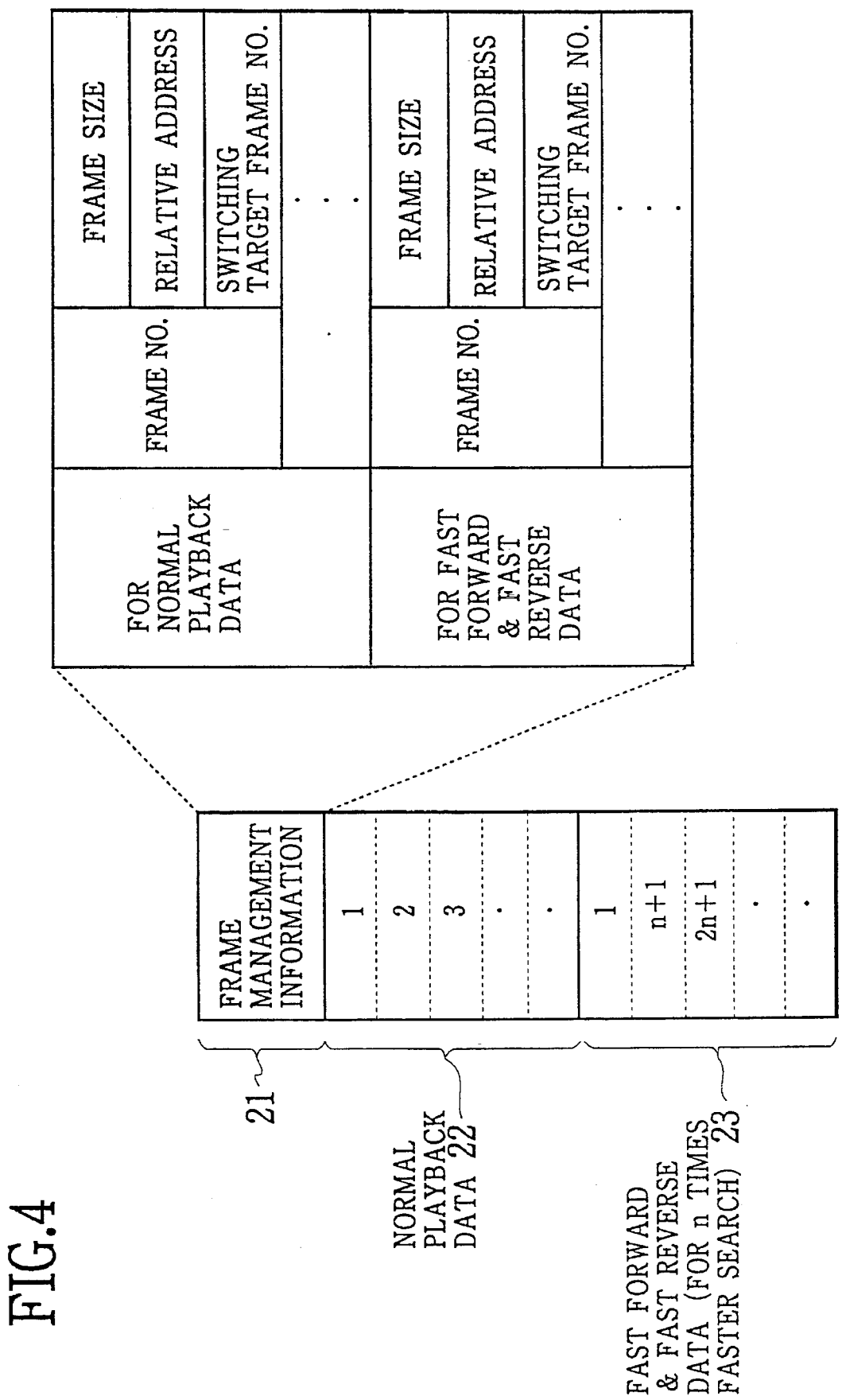
FIG. 4 is a diagrammatic illustration of a data format for each digital video file stored in the storage unit of the video-on-demand system of FIG. 3.

The storage unit 154 stores each digital video file in a data format shown in FIG. 4, which comprises a frame management information 21 to be used in managing the frames in the digital video file, normal playback data to be read out in a normal playback mode which are arranged in units of groups, and dedicated fast forward and fast reverse data for "n" times faster search, to be read out in fast forward and fast reverse modes, which are prepared in advance and also arranged in units of groups, where each block of the normal playback data and the fast forward and fast reverse data represents a frame and a number assigned to each block indicates a frame number. Thus, each adjacent frames of the fast forward and fast reverse data are separated by "n" frames in the normal playback data, so as to realize the "n" times faster search.

The frame management information contains an entry for each frame in the normal playback data as well as in the fast forward and fast reverse data, where each entry registers a frame number of each frame, a frame size of each frame, a relative address of each frame from a top of the file, and a switching target frame number indicating a frame number of the frame to be read out next when the mode switching occurs.

In this embodiment, at a time of the mode switching between the normal playback mode and either one of the fast forward and fast reverse modes, the user terminal 151 notifies a currently displayed frame number along with a mode switching request, such that the data management unit 160 can immediately recognize the next frame to be read out by looking up the entry of the frame management information in the digital video file which has the same frame number as the notified currently displayed frame number, and then looking up the switching target frame number registered therein. Here, in the data management unit 160, the frame management information 21 of each digital video file is read out from the storage unit 154 to the RAM 159 in the storage unit interface 155 at the beginning of an access to each digital video file, and looked up at the RAM 159 during the subsequent visual search control operation.

In order to realize the "n" times faster search in the fast forward and fast reverse modes, the switching target frame number In the entry for the frame of the normal playback data with the frame number "1" is given by the following expression:

$$\{[(i-1)/n]+1\}.n+1$$

where [] denotes the Gauss' symbol, which indicates the largest integer not greater than the value of the argument within these brackets. On the other hand, the switching target frame number in the entry for the frame of the fast forward and fast reverse data with the frame number "i" is set to "i+1".

In a case of data read out, the relative address for each frame to be read out registered in the frame management information 21 is looked up to calculate the physical address on the magnetic disk to be accessed, and the frame size for each frame to be read out registered in the frame management information 21 is looked up to determine a sufficient number of frames to form a group of frames to be transferred together to the user terminal 151.

In this manner, even in a case of the mode switching from the normal playback mode to the fast forward and fast reverse modes, the read out of the digital video data to be transferred to the user terminal 151 can be achieved by a single read head movement to an appropriate location in the fast forward and fast reverse data provided in each digital video file, so that the operational load required for the disk access can be made equal to that required in the normal playback mode.

Consequently, the constant frame rate (number of frames per second) can be guaranteed for all of the normal playback mode and the fast forward and fast reverse modes, so that the image quality in the fast forward and fast reverse modes can be as high as in the normal playback mode.

Moreover, by using the currently displayed frame number notified from the user terminal 151 at a time of the mode switching request as a key for looking up the frame management information 21, the mode switching between the normal playback mode and either one of the fast forward and fast reverse modes can be made very quickly.

More specifically, in this embodiment, the visual search control between the normal playback mode and the fast forward mode, for example, is carried out according to the timing chart of FIG. 5, as follows. Here, the same exemplary situation as that used in the above description of a conventional case will be used. That is, each video file containing video data as well as audio data is provided in a form of a bit sequence encoded at the bit rate of 6 Mbps, so that in order to realize 30 frames/sec. of the reading rate, each frame has 0.2 Mbits. Also, for the sake of simplicity, it is assumed that one group is formed by 18 frames, so that each group has 3.6 Mbits. The access time of the storage unit 54 is 50 msec., and the transfer rate of the storage unit 54 is 24 Mbps, so that a time required for reading one group is equal to 0.2 sec. In this embodiment, however, the reading of the digital video data to be transferred to the user terminal 151 is carried out in units of groups, even in the fast forward and fast reverse modes.

Figure 5:
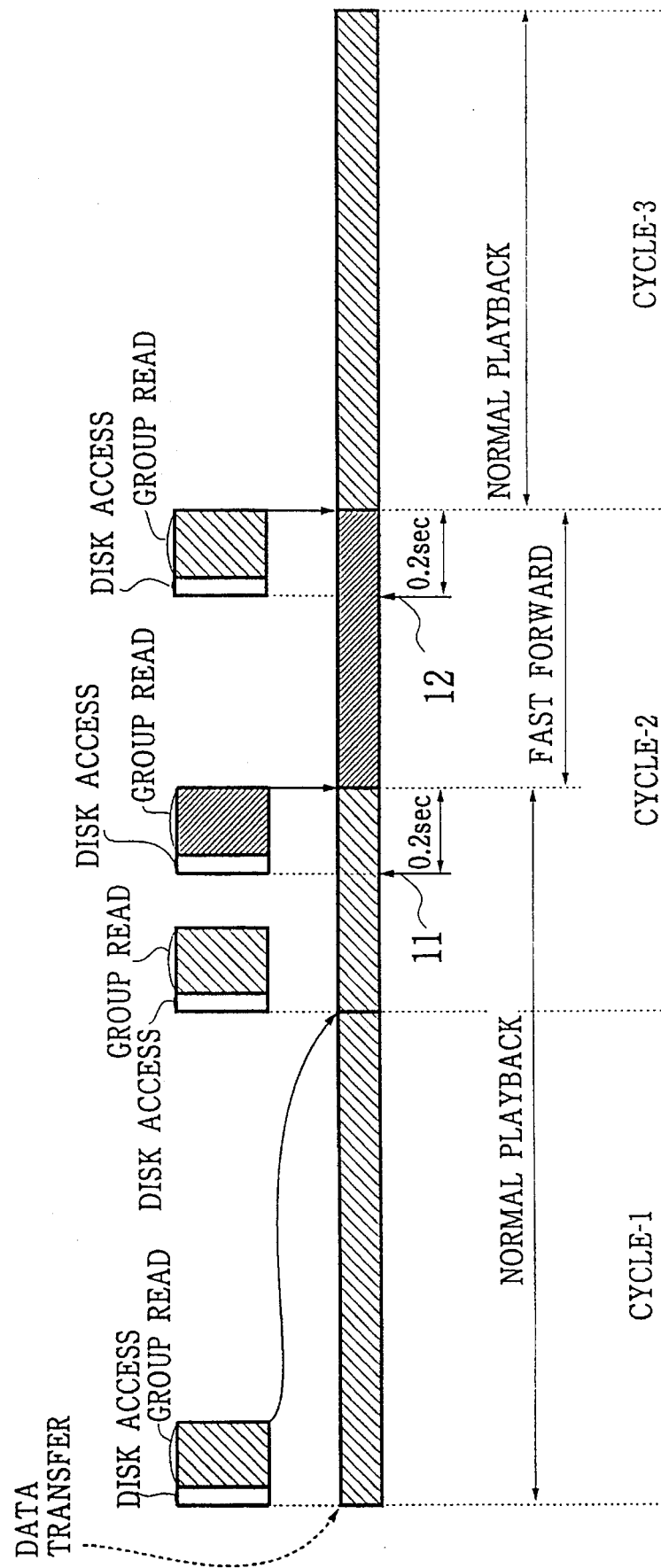
FIG. 5 is a timing chart for the visual search control operation in the video-on-demand system of FIG. 3.

Now, in an exemplary case depicted in FIG. 5, after the data transfer at the cycle-1, the normal playback mode is continued until the mode switching takes place in response to a mode switching request 11 to switch from the normal playback mode to the fast forward mode which is received from the user terminal 151 in a middle of the cycle-2. When this mode switching request 11 is received, according to the currently displayed frame number also notified along the mode switching request 11, the switching target frame number registered in the entry for the normal playback data in the frame management information 21 which has the same frame number as the notified currently displayed frame number is looked up, and the frame in the fast forward and fast reverse data specified by that switching target frame number is accessed. Then, a group of the fast forward and fast reverse data starting from the accessed frame is read out and then transferred to the user terminal 151. Here, a mode switching period of 0.2 sec. for making an access and reading out a group of frames is required between the receiving of the mode switching request 11 and the actual mode switching from the normal playback mode to the fast forward mode. During this mode switching period, the preceding mode of the normal playback mode is continued on the user terminal 151. Alternatively, the display on the user terminal 151 may be paused during this mode switching period.

Then, the next mode switching request 12 to switch from the fast forward mode to the normal playback mode is received during the cycle-2. When this mode switching request 12 is received, according to the currently displayed frame number also notified along the mode switching request 12, the switching target frame number registered in the entry for the fast forward and fast reverse data in the frame management information 21 which has the same frame number as the notified currently displayed frame number is looked up, and the frame in the normal playback data specified by that switching target frame number is accessed. Then, a group of the normal playback data starting from the accessed frame is read out and then transferred to the user terminal 151. Here, a mode switching period of 0.2 sec. for making an access and reading out a group of frames is also required between the receiving of the mode switching request 12 and the actual mode switching from the fast forward mode to the normal playback mode. During this mode switching period, the preceding mode of the fast forward mode is continued on the user terminal 151. Alternatively, the display on the user terminal 151 may be paused during this mode switching period.

Accordingly, in this embodiment, the data management unit 160 carries out the visual search control operation according to the flow chart of FIG. 6, as follows.

First, in response to the digital video file read out request received from the user terminal 151, the frame management information 21 of requested digital video file is read out from the storage unit 154 and set into the RAM 159 at the step 51.

At this point, a transfer frame number indicating a frame of the digital video data to be transferred next to the user terminal 151, which is set up in the RAM 159, is initialized to a top frame of the requested digital video file at the step 32.

Then, at the step 33, the current operation mode is checked to see if it is the normal playback mode or either one of the fast forward and fast reverse modes.

When it is the normal playback mode, the normal playback data are read out from the storage unit 154 in units of groups at the step 34, whereas when it is either one of the fast forward and fast reverse modes, the fast forward and fast reverse data are read out from the storage unit 154 in units of groups. Here, a group of sequential frames starting from the frame indicated by the transfer frame number in the RAM 159 is accessed and read out in each cycle. The initial setting of the operational mode is the normal playback mode.

Then, at the step 36, the digital video data read out at the step 34 or 35 are transferred to the user terminal 151.

Next, at the step 37, whether there is a mode switching request from the user terminal 151 or not and whether there Is a service ending request from the user terminal 151 are checked. In a case there is a service ending request, the operation is terminated.

When both the mode switching request and the service ending request are absent, next at the step 38, the transfer frame number in the RAM 159 is updated to a top of the next group to be transferred next, and the operation returns to the step 33.

On the other hand, when there is the mode switching request while the service ending request is absent, next at the step 39, the requested mode switching is carried out among the normal playback mode and the fast forward and fast reverse modes.

Then, at the step 40, according to the currently displayed frame number also notified along the mode switching request from the user terminal 151, the switching target frame number registered in the entry for the current data in the frame management Information 21 which has the same frame number as the notified currently displayed frame number is looked up in the RAM 159, and this switching target frame number is set to the transfer frame number in the RAM 159, and then the operation returns to the step 33, such that the frame Indicated by the switching target frame number will be accessed next.

It is to be noted here that, in this embodiment, the visual search functions other than the fast forward and fast reverse such as a pause, a still forward, a slow forward, etc. may also be facilitated in addition, by reducing a number of displayed frames per unit time on the user terminal 151 side in the normal playback mode.

It is also to be noted that the visual search control according to the present invention as described above 1s also quite advantageous in a case of realizing the multiple accesses to the digital video files in the video-on-demand system by using the time-slots synchronous method, because it becomes possible to reduce the data read out time such that the data read out can be achieved within a given slot time, and consequently it becomes possible to facilitate the visual search functions such as the fast forward and fast reverse modes without decreasing the multiple access rate.

It is also to be noted that, in the embodiment described above, the storage unit 154 has been incorporated within the data management unit 160 as a built-in memory device, but it is also possible to implement the visual search control according to the present invention by using the externally connected memory device instead of the built-in memory device.

It is further to be noted that many modifications and variations of the above embodiments may be made without departing from the novel and advantageous features of the present invention. Accordingly, all such modifications and variations are intended to be included within the scope of the appended claims.

What is claimed is:

1. A method of visual search control of digital video files, comprising the steps of:

(a) storing digital video files in storage means in a data format in which each digital video file contains: normal playback data to be read out in a normal playback mode; fast forward and fast reverse data to be read out in fast forward and fast reverse modes; and a frame management information containing an entry for each frame in the normal playback data and the fast forward and fast reverse data, where each entry registers a frame number of said each frame, and a switching target frame number indicating the frame number of a next frame to be read out next when a mode switching occurs;

(b) receiving a mode switching request along with a currently displayed frame number from a user terminal;

(c) looking up an entry in the frame management information of an appropriate one of the digital video files which registers the frame number identical to the currently displayed frame number received along the mode switching request at the step (b), to obtain the switching target frame number registered therein; and (d) carrying out the mode switching requested by the mode switching request received at the step (b) by making an access to the next frame indicated by the switching target frame number obtained from the entry looked up at the step (c), reading out digital video data starting from the next frame from an appropriate one of the normal playback data and the fast forward and fast reverse data stored in the storage means, and transferring the read out digital video data to the user terminal.

2. The method of claim 1, wherein at the step (a), the normal playback data and the fast forward and fast reverse data are arranged in units of groups of frames in the storage means, such that the digital video data starting from the next frame are read out in units of groups at the step (d) in any of the normal playback mode and the fast forward and fast reverse modes.

3. The method of claim 1, wherein at the step (a), each entry in the frame management information further registers a frame size of each frame.

4. The method of claim 1, wherein at the step (a), each entry in the frame management information further registers a relative address of each frame from a top of said each digital video file.

5. The method of claim 1, further comprising the step of setting the frame management information for an appropriate one of the digital video files in an random access memory in accordance with a digital video file read out request from the user terminal, such that the entry in the frame management information is looked up at the step (c) in the random access memory.

6. An apparatus for visual search control of digital video files, comprising:

storage means for storing digital video files in a data format in which each digital video file contains: normal playback data to be read out in a normal playback mode; fast forward and fast reverse data to be read out in fast forward and fast reverse modes; and a frame management information containing an entry for each frame in the normal playback data and the fast forward and fast reverse data, where each entry registers a frame number of said each frame, and a switching target frame number indicating the frame number of a next frame to be read out next when a mode switching occurs; and data management means for receiving a mode switching request along with a currently displayed frame number from a user terminal, looking up an entry in the frame management information of an appropriate one of the digital video files which registers the frame number identical to the currently displayed frame number received along the mode switching request to obtain the switching target frame number registered therein, and carrying out the mode switching requested by the mode switching request by making an access to the next frame indicated by the switching target frame number obtained from the entry looked up, reading out digital video data starting from the next frame from an appropriate one of the normal playback data and the fast forward and fast reverse data stored in the storage means, and transferring the read out digital video data to the user terminal.

7. The apparatus of claim 6, wherein the normal playback data and the fast forward and fast reverse data stored in the storage means are arranged in units of groups of frames in the storage means, such that the data management means reads out the digital video data starting from the next frame in units of groups In any of the normal playback mode and the fast forward and fast reverse modes.

8. The apparatus of claim 6, wherein each entry in the frame management information stored in the storage means further registers a frame size of each frame.

9. The apparatus of claim 6, wherein each entry in the frame management information stored in the storage means further registers a relative address of each frame from a top of said each digital video file.

10. The apparatus of claim 6, further comprising a random access memory to which the frame management information for an appropriate one of the digital video files is set in accordance with a digital video file read out request from the user terminal, such that the data management means looks up the entry in the frame management information in the random access memory.

* * * * *